United States Patent
Del Toro et al.

(10) Patent No.: US 9,521,236 B2
(45) Date of Patent: Dec. 13, 2016

(54) WIRELESS VISUAL NOTIFICATION DEVICE FOR MOBILE DEVICE

(71) Applicant: INCIPIO, LLC, Irvine, CA (US)

(72) Inventors: Carlos Del Toro, Whittier, CA (US); Jin Woo Choi, Irvine, CA (US); Andy Fathollahi, Corona Del Mar, CA (US); Ahmed Fathy Abdallah, Mission Viejo, CA (US)

(73) Assignee: INCIPIO, LLC, Irvine, CA (US)

( * ) Notice: Subject to any disclaimer, the term of this patent is extended or adjusted under 35 U.S.C. 154(b) by 0 days.

(21) Appl. No.: 14/582,886

(22) Filed: Dec. 24, 2014

(65) Prior Publication Data
US 2015/0187187 A1    Jul. 2, 2015

Related U.S. Application Data

(60) Provisional application No. 61/924,189, filed on Jan. 6, 2014, provisional application No. 61/920,721, filed on Dec. 24, 2013.

(51) Int. Cl.
*G08B 1/08* (2006.01)
*H04M 1/725* (2006.01)

(52) U.S. Cl.
CPC ....... *H04M 1/7253* (2013.01); *H04M 2250/02* (2013.01)

(58) Field of Classification Search
CPC ..... H04L 12/58; H04L 12/587; H04W 88/184; H04W 68/00; H04M 1/00

(Continued)

(56) References Cited

U.S. PATENT DOCUMENTS

| | | | |
|---|---|---|---|
| 9,219,826 B2 * | 12/2015 | Sweeney | H04M 19/04 |
| 2005/0269580 A1 * | 12/2005 | D'Angelo | H05B 33/0818 257/88 |

(Continued)

OTHER PUBLICATIONS

Nick Guy, "Review: Incipio Prompt Visual Notification Pod," Jun. 16, 2014, http://www.ilounge.com/index.php/reviews/entry/incipio-prompt-visual-notification-pod/.

*Primary Examiner* — Phung Nguyen
(74) *Attorney, Agent, or Firm* — Manatt, Phelps & Phillips, LLP

(57) ABSTRACT

Disclosed herein are visual notification devices that are capable of wirelessly connecting to a mobile device to provide visual and/or audible notification to users of status changes on their mobile device, such as receipt of SMS, MMS, phone calls, voice mails, calendar appointments, and battery status in a location different from that of the mobile device. In operation a user can place the device in or near a working space (e.g. on a desk, book shelf or table), plug it into an automobile charging port, or strap it on the user's arm, so that the device is in a location different than the user's mobile device The user can visually and/or audibly notified of status changes by simply glancing at the device. The notifications can be user customizable through a user application on the mobile device. Additional user interfaces can be incorporated into the device to provide a set of remote controls for various operation of the mobile device. The user therefore need not repeatedly and continuously open and close the mobile device to determine whether there has been a status change, which is not only time consuming, an unnecessary consumption of battery life, but can also be burdensome and a hazardous distraction.

13 Claims, 9 Drawing Sheets

(58) Field of Classification Search
USPC .............. 340/539.11, 636.19, 691.6, 815.45, 340/815.65, 384.1; 455/412.2, 567
See application file for complete search history.

(56) References Cited

U.S. PATENT DOCUMENTS

2008/0248837 A1* 10/2008 Kunkel ......................... 455/566
2012/0108215 A1* 5/2012 Kameli ....................... 455/412.2
2014/0171055 A1* 6/2014 Oshita ........................... 455/418

* cited by examiner

WIRELESS VISUAL NOTIFICATION DEVICE FOR MOBILE DEVICE

INCORPORATION BY REFERENCE TO RELATED APPLICATIONS

This application claims benefit under 35 U.S.C. §119(e) from U.S. Provisional Application No. 61/924,189, filed on Jan. 6, 2014, and U.S. Provisional Application No. 61/920,721, filed on Dec. 24, 2013, the disclosures of which are incorporated herein by reference in their entirety.

BACKGROUND OF THE INVENTION

1. Field of the Invention

This patent document relates to a wireless device that provides visual and/or audio notifications regarding events or communications received and/or sent by a wirelessly connected mobile device.

2. Description of the Related Art

Portable electronic devices such as mobile phones, PDAs, tablet devices and the like are becoming more and more ubiquitous in today's always connected society. Users of such device find themselves repeatedly checking those devices for new communications such as missed calls, new emails, texts, voice messages, or calendar appointments etc. Applicant has recognized that there is a need therefore for a notification system that can provide users with customizable and resettable notifications in a user friendly manner. Such need may be particularly acute for those with impaired hearing and/or sight, those that regularly multi-task, or anyone else needing or benefitting from visual and/or audio notification.

SUMMARY OF THE INVENTION

There exists a continuing need for new and improved wireless visual and/or audio notification that allows the user to monitor status and/or alert events on their mobile device without repeatedly checking it. Various aspects are summarized below.

A wireless visual notification device for receiving notifications from a mobile device is disclosed that comprises a housing having an upper semi-transparent shell that is received within a lower base; an assembled printed circuit board (PCBA) contained within the housing that includes one or more RGB LEDs, a Bluetooth interface module capable of being wirelessly paired or otherwise connected with the user's mobile device; and a microcontroller that is capable of controlling the duration, intensity, and/or color of light that is emitted by the LEDs. A battery such as a rechargeable battery may also be contained within the housing to provide power to the LEDs, Bluetooth module, and microcontroller. The microcontroller is configured to control the LEDs based on notification signals wirelessly sent from the mobile device and received by the Bluetooth module. The notification messages may be sent via the native iOS service of an Apple device or via user interface application such as an Android or iOS compatible user application that resides on the user's mobile device. (Apple is a trademark of Apple Inc.; Android is a trademark of Google Inc.; iOS is a trademark of Cisco Systems, Inc.)

The visual notification device may also include a speaker contained within the housing that is controlled by the microcontroller in response to the received notification signals. The microcontroller may be capable of controlling the RGB LEDs so that they blink and/or fade in and out in a fixed duration, intensity and timing pattern. The RGB LEDs may be controlled in such a way that the light emitted from the shell may include one or more of the following colors white, teal, cyan, blue, pink, purple, green, yellow, orange, and red light. An ambient light sensor may be included in the device and configured to sense the intensity of light external thereto and provide the sensed input to the microcontroller to adjust the intensity of the light being emitted by one or more of the LEDs. A Universal Serial Bus (USB) connection may be incorporated into the device such as into the device housing and connected to the rechargeable battery to facilitate recharging of the battery. The USB connection may alternatively or in addition be connected to microcontroller to facilitate direct non-battery powering of the microcontroller, the Bluetooth module and LEDs. A depressible button may be located on the underside of the PCBA that when depressed triggers various operations including one or more of the following: (a) activating the notification device to allow pairing with the mobile device, (b) cancel a visual or audible notification, (c) triggering a demo mode operation of the device to present a pre-set display of light colors at specified durations or patterns, (d) triggering the notification device to check the rechargeable battery voltage and display a visual representation of the percentage of batter voltage remaining on the battery, and (e) turning on and off the power to the device. A user button interface may be positioned on the outer bottom face of the base and configured to engage the depressible button when the user presses down on the shell. The notification device may be implemented using an LED light emitting ring incorporated into the housing of a car charger. Other sensors such as motion, touch and sound sensors may be included in the device to allow the user to interact with the device with hand motions, touch, or sound.

In yet a further aspect, the wireless visual and/or audio notification device may be incorporated into a wrist band that straps around a user's wrist or arm. The device may further include a user control interface that is adapted to remotely control one or more of the functions or features of the mobile device, for example, the audio (volume, play, pause, etc.) and/or camera features (shutter, record, etc.) including video feature thereof. The notification and control functions may interface wirelessly with the mobile device via a Bluetooth interface module.

Various aspects are described in the claims and throughout the specification and may be combined.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

DETAILED DESCRIPTION OF THE PREFERRED EMBODIMENT

Disclosed herein is a prompt visual notification devices in the form of a pod, ring, or wrist/arm band that is capable of wirelessly connecting to a mobile device to provide visual and/or audio notifications of events on a user's mobile device, such as a smart phone or the like. The devices are capable of visually and/or audibly notifying users of status changes on their mobile device or smart phone, such as receipt of SMS, MMS, phone calls, voice mails, calendar appointments, and battery status in a location different from that of the mobile device. In operation, a user can place the device in or near a working space, such as desk, book shelf, table, or in the case of a ring plug in a dashboard in a car or vehicle etc, or in the case of an wrist/arm band around the user's arm or wrist, and be visually notified of status changes or alerts by simply glancing at the device. The device is configured so that it can be resettable by simply tapping the device and/or interacting with the device via motion, touch and/or sound sensors or buttons. The user therefore need not repeatedly and continuously open and close their mobile device to determine whether there has been a status change or an alert, which is not only time consuming and burdensome but also consumes battery life. The notifications can be user customizable through a user application on the mobile device.

Figure 1A:
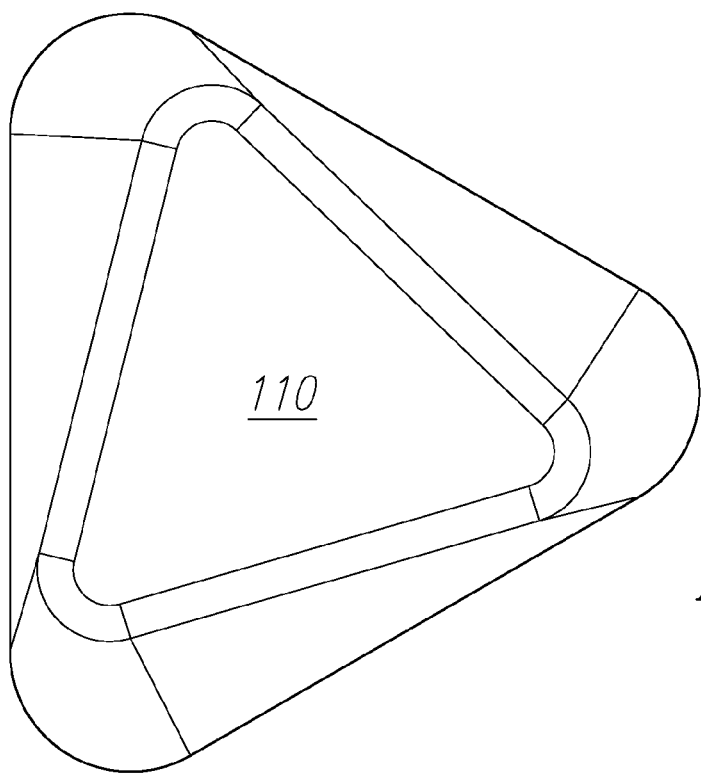
FIGS. 1A-1G are top, bottom, left, right, front, back, and perspective views, respectively, of an assembled visual notification pod.
Figure 1B:
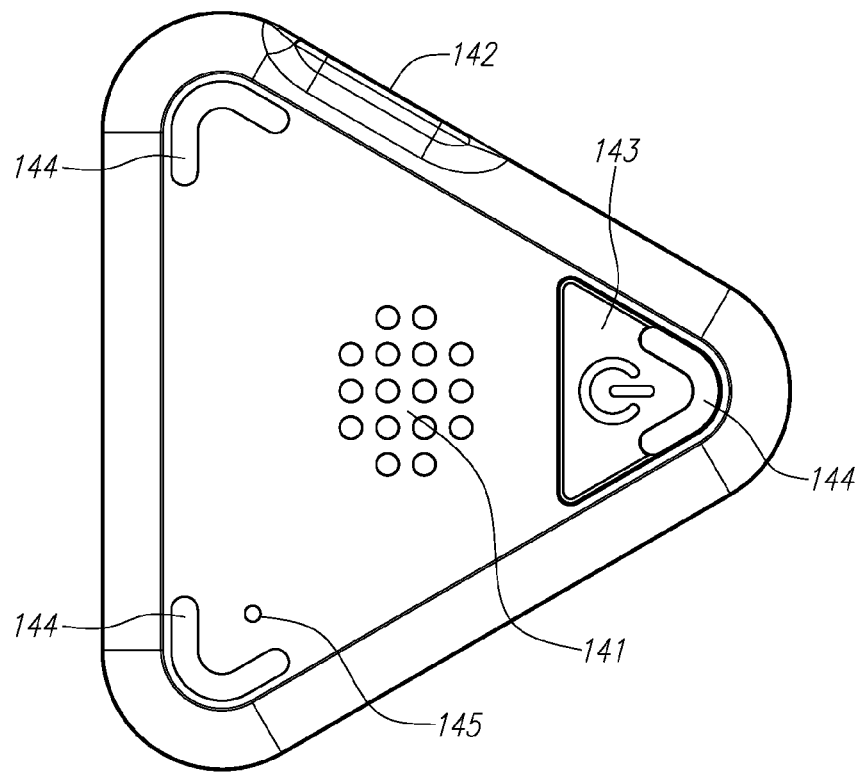
Figure 1C:
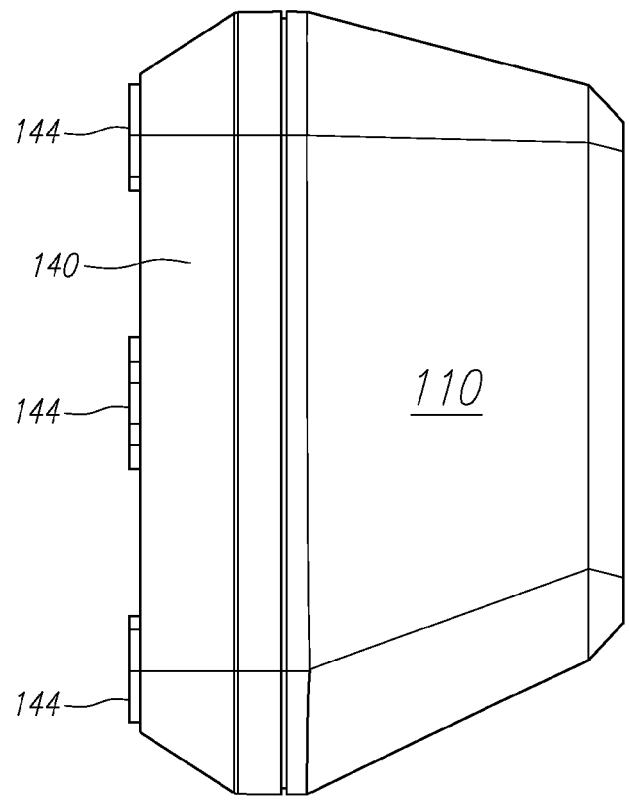
Figure 1D:
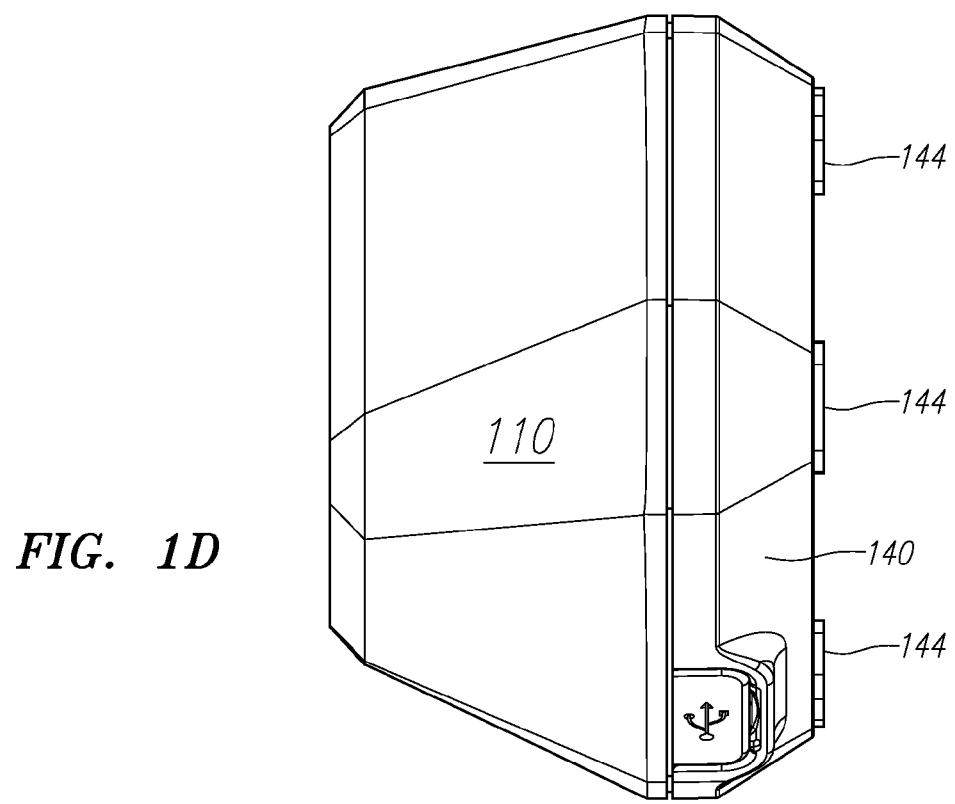
Figure 1E:
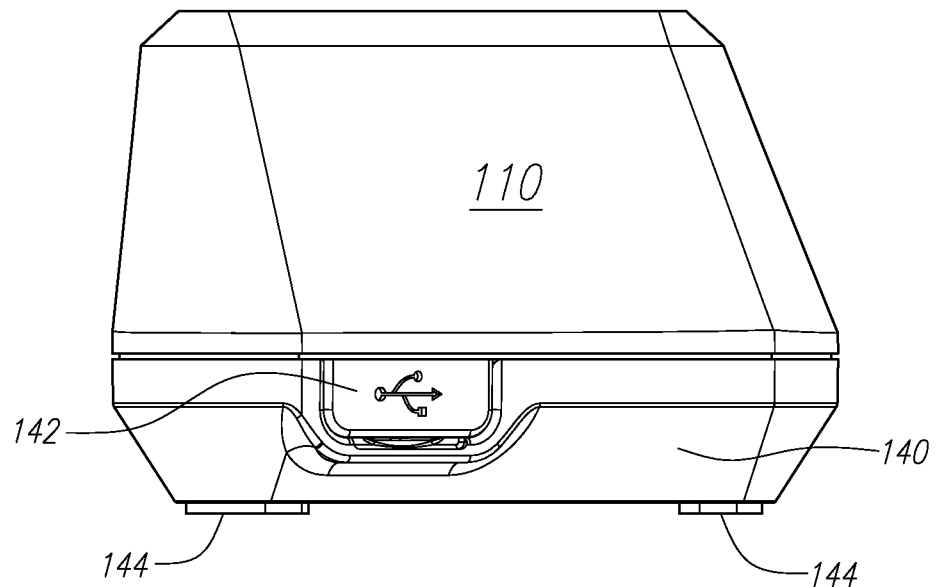
Figure 1F:
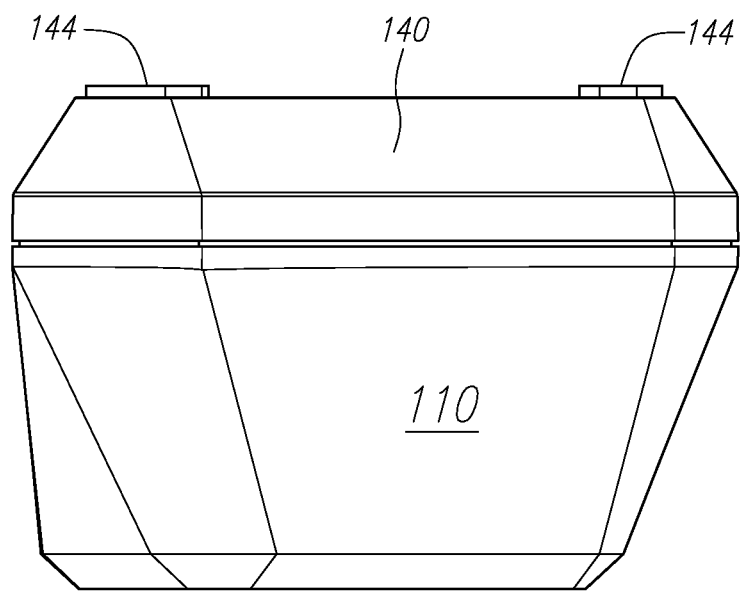
Figure 1G:
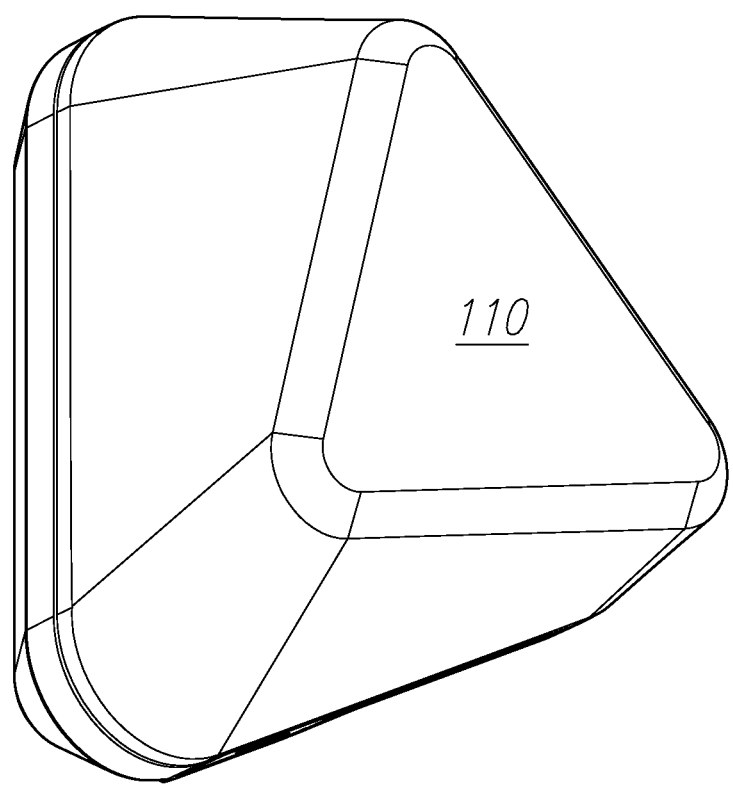
Figure 2:
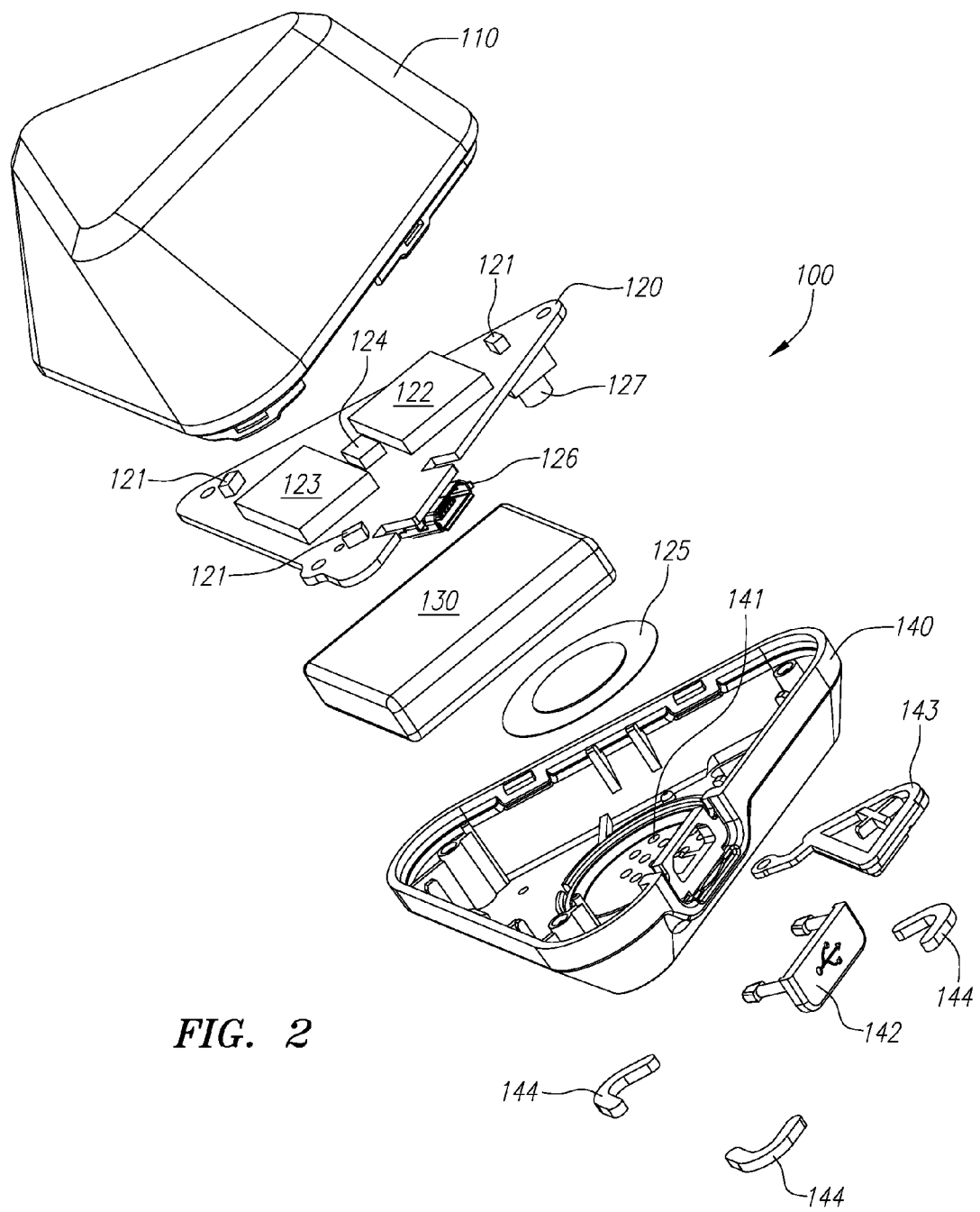
FIG. 2 is an unassembled perspective view of the various components of the visual notification pod illustrated in FIGS. 1A-1G.
Figure 3:
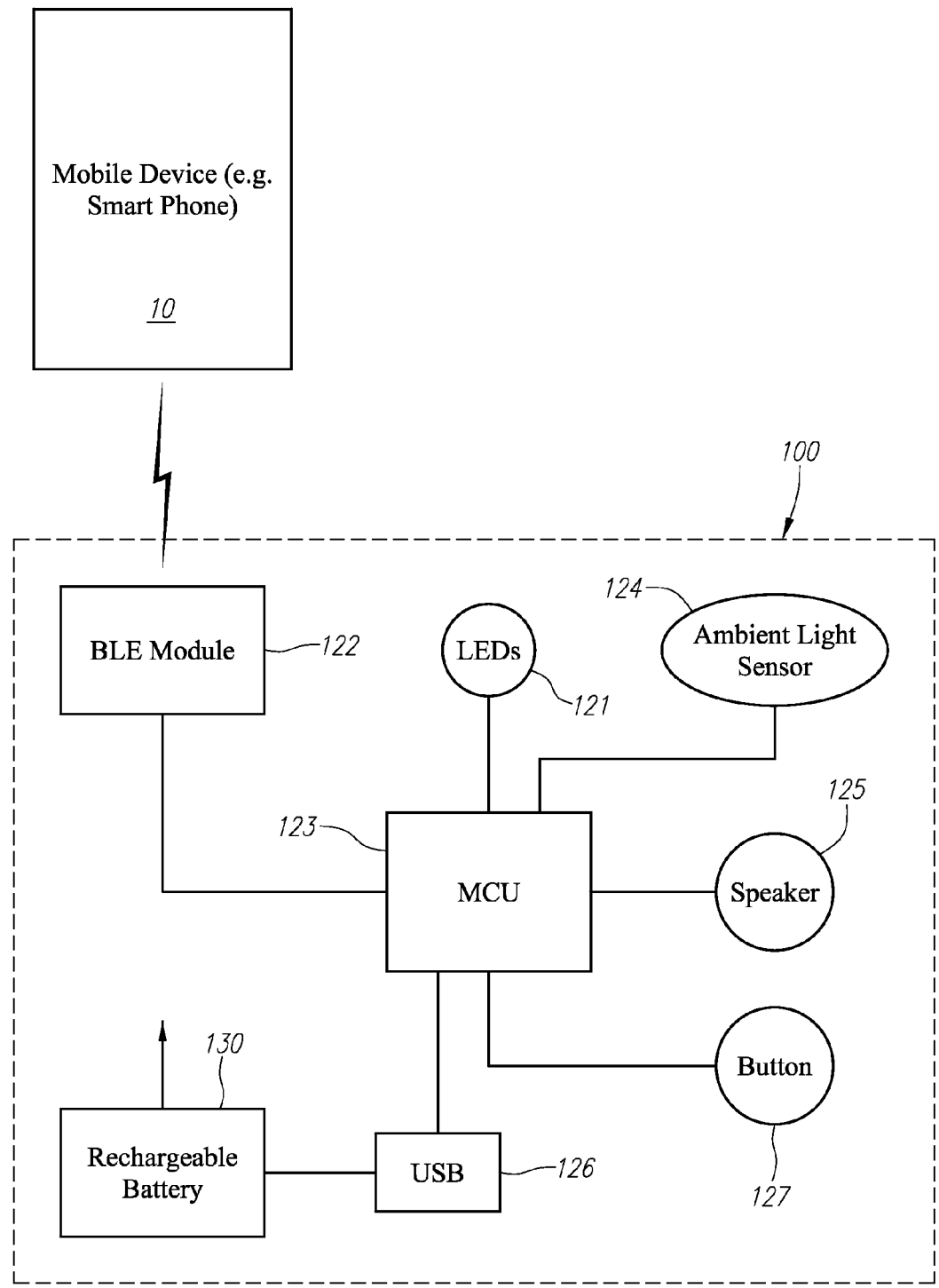
FIG. 3 is a block diagram of the system and circuit components of the visual notification pod illustrated in FIGS. 1A-1G.

FIGS. 1-3 commonly illustrate various features of a visual and/or audio notification pod device 100 that include a semi-transparent shell 110 that forms the upper-housing of the device 100 and disperses the light emitting therefrom. The shell 110 is designed to allow sufficient transmission of light. The shell 110 may be white, or any desired color, to filter the internal light sources and allow the user to appreciate the various colors that may be created by the RGB LED light sources 121 illuminating the shell, which are described, in more detail, below. The shell 110 is mounted to a corresponding lower housing or base component 140 that is configured on its upper perimeter region to mate with and attach to the upper housing formed by the shell 110 via clips and/or screws. Any suitable attachment means may be employed including adhesion. The device 100 may be powered by a rechargeable battery 130 that is contained within the lower housing 140.

Also contained and mounted within the housing of the device is an assembled printed circuit board (PCBA) 120 that controls and provides the visual and audio notifications. The circuitry of the PCBA 120 may include the following components:

a. three red green blue (RGB) LEDs 121 that emit RGB light to create a spectrum of light colors, which can be emitted in different durations and intensity patterns (for example, the RGB LED can blink and breath (fade in and out) in patterns), each of which can represent one or more notifications;

b. a Bluetooth low energy communication module 122 that is capable of transmitting and receiving wireless communications or notifications from the mobile device to which it is paired, a GATT protocol may be used;

c. a micro-controller (MCU) 123 that controls the light being emitted by the RGB LEDs 121 and the sound being emitted by the Piezo speaker 125 wired to the PCBA;

d. an ambient light sensor 124 that senses the intensity of light external to the lens and provides that input to the microcontroller so that the micro-controller 123 can adjust the intensity of the light being emitted by the LEDs 121 to conserve energy when there is low ambient light external to the device while also controlling the intensity of the light so that light will not be too bright at night or too dim in a well lighted environment;

e. a micro Universal Serial Bus (USB) connection 126 that provides a connection by which the rechargeable battery 130 can be charged and also provides an alternative power connection to the device 100 to allow the device to be powered directly via a wall plug connection;

f. a depressible button 127 located on the underside of the PCBA 120 that triggers various operations of the device including:

g. (1) activating the device into pairing mode to allow the device to pair with the user's mobile device (e.g., press and hold shell 110 down to depress button for 2 seconds);

h. (2) reseting or canceling a notification, which allows a user to dismiss notifications from being cycled through the notification device once the user depresses the device to activate the button (e.g., tapping the top of shell 110 once to briefly depress and release the button 127, other sensors may also serve to allow the user to reset or cancel a notification);

i. (3) triggering demo mode for the device, which, for example once triggered, can flash a pre-set or pre-programmed presentation of light colors at specified durations or patterns (e.g., press and hold shell 110 down to depress button 127 for 6 seconds);

j. (4) triggering the device 100 to go into battery check mode, which provides notification or indication on the remaining battery 130 voltage or life (e.g., press down on shell 110 to depress button 127 and let go); and k. (5) turning on and off the power to the device 100 (e.g., press and hold shell 110 down for 2 seconds or some other duration thereby depressing the button 127 for a specified duration).

It should be understood that while a single PCB may be employed, the functionality and operations set forth above may be embodied in multiple PCBs and/or distributed among one or more discrete electronic components that effectuate, either in hardware or software or a combination thereof, the desired functionalities described above.

The base 140 that forms the lower housing of the device 100 includes a speaker grill 141 on the bottom face that facilitates the communication of audio signals emitted from the speaker 125 and a micro USB cover 142 that is configured to allow the user to clip it in and out of the base 140 to cover or gain access to the USB connection 126. The base 140 further includes a user button interface 143 positioned on the outer bottom face of the device 100 that allows the user to engage and depress the depressible button 127 from the bottom side of the device 100. The button interface 143 is levered such that when the housing is depressed the button interface 143 engages and depresses the button 127. The bottom side of the device 100 also includes support feet 144 at the corners of the device 100 including one on the button interface 143. The feet 144 provide elevated support to facilitate movement of the device 100 when depressed by the user as well as a non-scratch, non-slip contact surface. The bottom face may also include a reset pin hole 145 that allows the user to access the reset pin on the Bluetooth module to reset the Bluetooth module.

In operation, the user turns on the device and pairs (via the Bluetooth interface module 122) the user's mobile device to the notification device 100. One quick beep from the speaker may be programmed into the device to signal that the device is on and pairing confirmation may be programmed to be represented by three quick cyan blinks. Once paired or otherwise wirelessly connected, the visual notification device or pod 100 receives status changes and alerts (such as those previously noted) via the Bluetooth module 122, which feeds those communications to the MCU 123, which in turn controls the LED lights to emit light of a specified color, duration and/or intensity and can also sound beeps or noises through the speaker 125. The notification messages may be sent via the native Apple iOS service or via a specific user interface application, such as an Android application.

Should the mobile device exit the operability zone (i.e., wireless connectivity zone), a user interface application on the device may be programmed to generate a pop up notification informing the user that the device is out of range of the notification device 100. Upon reentering the operating zone or range, the device 100 will automatically re-pair or wirelessly connect with the mobile device.

When the notification signals from the mobile device are received by the Bluetooth module 122 of the notification device 100, they are communicated to the MCU 123, which in response generates control signals that activate visual (via the LEDs 121) and/or audio (via speaker 125) indicators representative of those notifications. The notification device 100, for example, may have visual notification colors set as defaults for the various status changes and alerts set forth in the table below.

| | | | | | Default Colors | | | | | |
|---|---|---|---|---|---|---|---|---|---|---|
| | White | Teal | Cyan | Blue | Pink | Purple | Green | Yellow | Orange | Red |
| Category ID | Incoming Call | News +Business & Finance | Voice-mail | Email | Entertainment +Internal App Alarm Clock | Health & Fitness | Social | Location +Other | Schedule | Missed Call |
| Expected Notifications | Incoming Call | News/Biz/Fin Alerts | Voice-mail | Email Bluetooth Pairing | Games, Entertainment App Alerts App Enabled Alarm Clock | Health App Alerts | Test Messages Social App Alerts | All Other Notifications | Calendar Events | Missed Call Phone Battery <20% Network & Wi-Fi not connected & Airplane Mode |
| Prompt Battery Level Indicator | | | | | | | Prompt Battery = HIGH | Prompt Battery = MEDIUM | | Prompt Battery = LOW (changing this to Red) |
| Prompt Charging Indicator | | | | | | | Prompt Micro USB Plugged in (0.5 s Blinks 3 Times with 0.5 s Interval) | | | |
| Lamp Mode | APP Enabled - All colors available to be turned on/off individually (e.g., night light or simple illustration around the house) | | | | | | | | | |
| Demo Mode | APP Enabled - Demo mode = breathes through all colors forever | | | | | | | | | |

Checking the remaining battery 130 capacity or life may be based on estimated voltage level of the battery 130, such that the color green may be programmed to represents 70-100% capacity remaining, the color yellow may be programmed to represent 40-70% capacity remaining, and the color red may be programmed to represent 1-40% capacity remaining Notification of battery status may be programmed to be displayed as a solid colored light for 3 seconds. The GATT battery service (BAS) profile may show the state of the battery 130. With respect to the battery, a 380 mAh battery capacity may be employed, which at an average power consumption of 8 mA is potentially capable of providing approximately 16 days of use without recharge.

It should be understood that the notification colors can blink or fade in and out to create light patterns and/or be combined with audio beeps that correspond with the blinking of the light or audio breathing noises that audibly fade in and out to correspond to the fading in and out of the visual notification emitted by the LEDs 121.

When there are multiple notifications, the device cycles through the notifications one at a time until such time that the notifications become stale or are cancelled out by the user. Whether a notification is stale or not may be based on the time that has passed since the notification was first triggered or the number of notifications in cycle on a first in first out basis. For example, a notification may be staled or timed-out of the cycle if it has been in the cycle for a pre-determined or selected amount of time or if the number of notifications allowed to be displayed by the cycle is exceeded and the subject notification has been in the cycle the longest. Alternatively, the notification may be cancelled-out of the cycle by the user, for example, by the user depressing the button 127 in pre-determined manner or duration. The user may depress the button, by tapping or pressing down on the top of the shell 110 in response to or at a time when the notification that the user is seeking to cancel is active (i.e., visually and/or audibly being communicated by the pod). When the shell 110 is pressed-down, the base 140 is also pressed down, such that the button interface 143 (which is levered to a more central region of the housing) engages or mechanically depresses and activates the button 127. The notifications may be may prioritized in a hierarchy based on importance. The hierarchy can be pre-determined in any order such as in order starting from left and going to right in table above or customized by the user in any manner.

It is also contemplated that the notification may be cancelled-out of the cycle by the user interacting with the device using one or more other sensors, including for example photo cells sensitive to user motion, capacitive sensors sensitive to user touch, and sound sensors sensitive to user noises or sound. For example, a motion sensor or photo cell (not shown) may be included within the housing of the device 100 and connected to the microcontroller 123, such that when the user waives a hand at the device, the motion sensor senses the motion that is communicated to the microcontroller which in turn cancels the notification from the cycle. Similarly, a microphone or sound sensor may be housed within the housing and connected to the microcontroller 123, such that if the user makes the requisite sound (e.g. claps hands, snaps fingers, says the word "cancel", taps desk, etc.), that sound is sensed, and communicated via signals to the microcontroller 123 for processing. The microcontroller 123 then cancels the notification from the cycle of notifications upon receipt of the requisite sound signal from the microphone. A capacitive sensor or a biometric sensor may also or alternatively be placed on the device 100 and connected to the microcontroller 123 such that the user may touch to cancel notifications from the cycle. Hence, upon receipt of the requisite touch signals from the touch sensor, the microcontroller 123 would cancel the notification from the notification cycle by no longer sending the signals for the notification to the LEDs 121 and/or the speaker 125.

In use, the user can have multiple devices in different rooms or locations for easy access to status notifications. The housing of the device can be made of suitable plastic, glass, metal and/or combination thereof. A user interface application on the paired mobile device can facilitate the user to control the color and notification settings so as to customize the visual and audio signals to correspond to user selected status notifications or alerts. The user applications may be compatible with Apple iOS for Apple devices and/or Android operating systems. It should be understood, however, that the prompt may be used without the application in that the iOS native ANCS functionality may be supported, although the colors may not be customizable. It should be also noted that the visual prompt may be used in lamp mode or as a night light by the user by selecting or enabling this mode from the user application. In operation, the lamp mode could discontinue control over the LEDs and/or speaker resulting from notifications status events or alerts. Once lamp mode is discontinued, such alerts or status notifications could re-continue or begin anew. Alternatively, lamp mode could continue to operate in a dual mode to provide notifications on status events and alerts in the same manner or a modified manner (for example displaying status/alert notifications in a more subdued or less intense light and/or audio).

Figure 4:
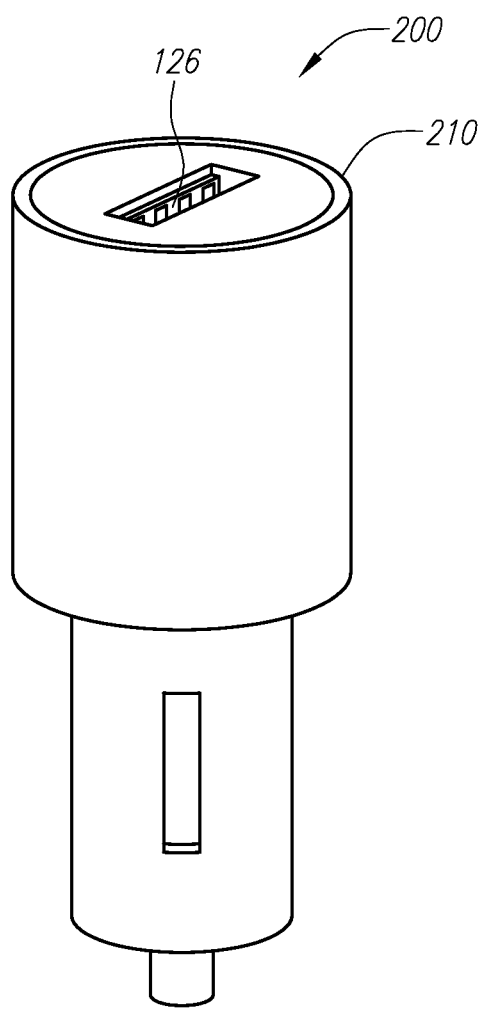
FIG. 4 is an alternative embodiment of the visual notification device in the form of a notification LED ring built into the housing of car charger adapter.

FIG. 4 discloses another embodiment of the visual notification device that is in the form of a notification LED ring 210 that encircles the perimeter of a car charger 200. The car charger housing contains the various components illustrated in FIG. 3 in the operative manner as previously described. However, in this implementation there would be no need to house a rechargeable battery as the power source would be the car battery or electrical system. The USB connection 126 would serve as a connector to charge the mobile device as opposed to charging a rechargeable battery 130, which one not be as needed. It should be understood that while a USB connection 126 is disclosed, any suitable mobile device connection or connector may be employed such as an Apple 30 pin or 8 pin connector. This embodiment is particularly useful in that it is capable of mitigating driver distraction that occurs from checking mobile device for messages and calendar events or alerts while driving.

Figure 5:
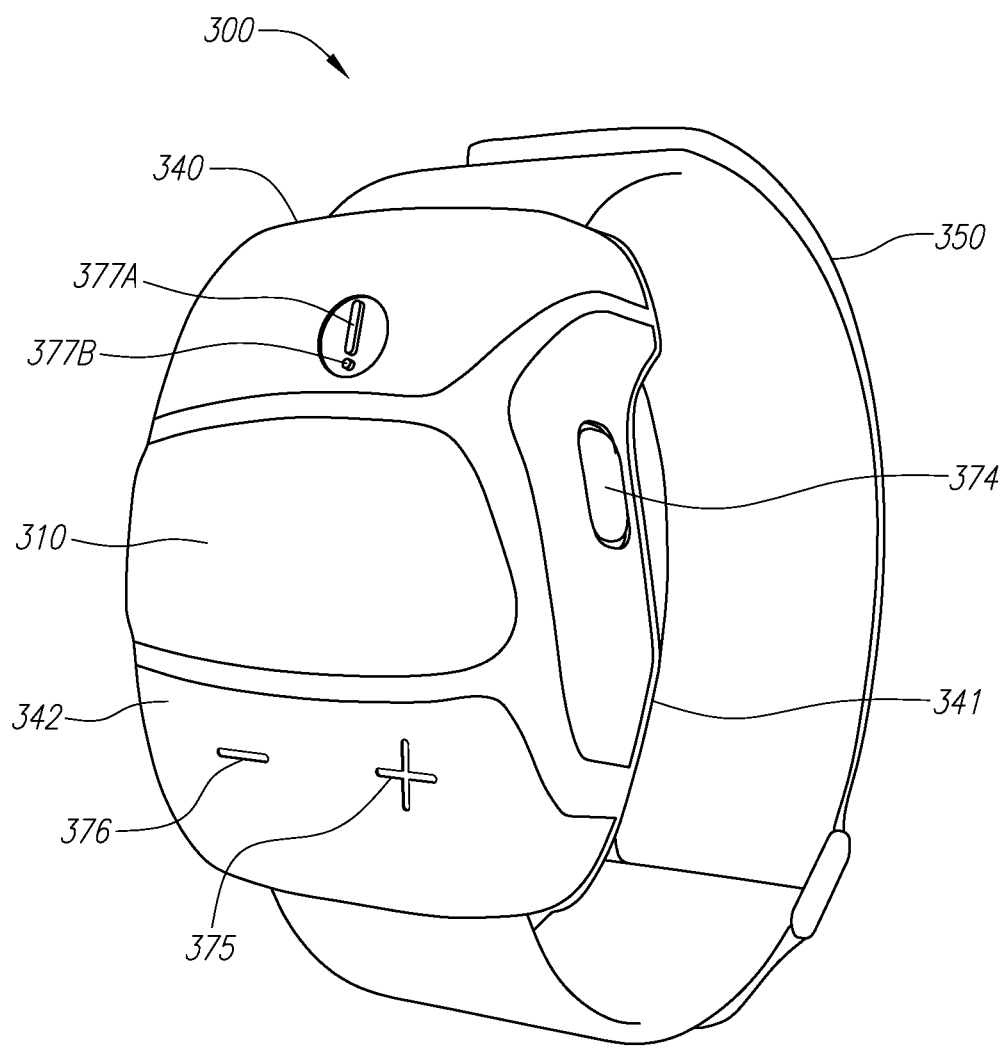
FIG. 5 is an illustration of a wrist or arm band implementation of the visual notification pod which may include a wireless user interface module that communicates with the mobile device to allow the user to remotely control the mobile device features such as for example the audio (volume, play, pause, etc.) and/or camera features (shutter, record, etc.) including video feature thereof of the mobile device as well as receive and/or display visual and/or audio notification of events and/or communications received by the mobile device.
Figure 6:
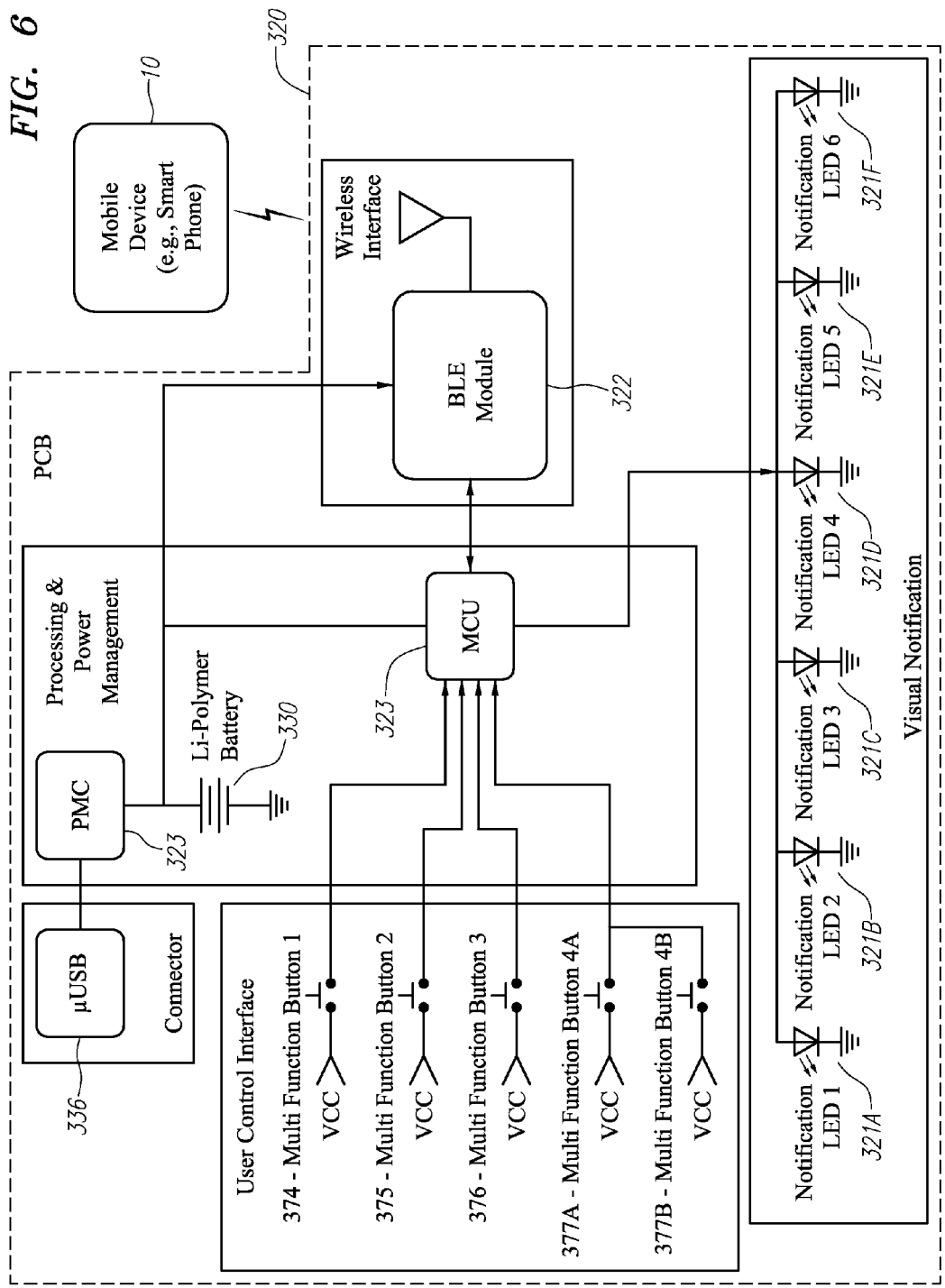
FIG. 6 is a block diagram illustrating the electronic circuit components of the device illustrated in FIG. 5 and their interrelationship.

FIGS. 5 and 6 discloses yet another embodiment of the visual notification device that is in the form of a user wearable band 300 that can be secured by an adjustable strap 350 to a user's arm, wrist or leg directly or external to clothing such as a ski jacket or work out clothing while the user's mobile device is secured in a back pack or location on the user. The mobile device may be connected, wirelessly or via hard wires, to ear phones or earphone buds with or without microphone so that the user can listen to music and/or communicate with or through the device while in an active state like skiing, jogging or biking or other movement.

As best illustrated in FIG. 5, the band 300 in this depicted implementation is comprised of a housing 340 that is removable or permanently attached to the adjustable strap 350 and defines an enclosed cavity that contains the electrical circuitry that facilities the user interfaces and communicates with the mobile device, described in more detail below. The housing 340 may be cylindrically curved (watch-like) to define inner and outer perimeter surfaces or faces 341 and 342, such that the inner perimeter surface 341 may generally correspond to the curvature of a person's limb to which the band is to be attached.

The housing 340 includes an aperture that is fitted with a visual notification light translucent panel or lens 310, which, like the shell 110 described above, is designed to allow sufficient transmission of light and may be white, or any desired color, to filter the internal light sources and allow the user to appreciate the various colors that may be created by the RGB LED illuminating light sources 321A-F, which are described in more detail below The translucent panel is positioned centrally within the housing on the outer perimeter surface or face so that it can be easily seen or glanced at by the user.

Multiple user interface buttons 374, 375, 376 and 377A-B, which allow the user to interact and control the functionality of the band 300, are located on the outer surface of the housing 340 as illustrated in FIG. 5. While the user interface buttons can control any number of operations, in the illustrated embodiment the buttons have the operations set forth in the following table.

| Reference No. | Button No. | Functionality |
|---|---|---|
| 374 | 1 | Play music or media source |
|  |  | Pause music or media source |
|  |  | Track forward music or media source |
|  |  | Track backward music or media source |
| 375 | 2 | Volume up |
|  |  | Snap photo or shoot video |
| 376 | 3 | Volume down |
|  |  | Answer or hang-up a telephone call. |
| 377A | 4A | Clear notification |
| 377B | 4B | Check internal battery level |

A micro USB or other communication/power port or connection 336 may also be positioned on the housing 340 to provide, like the micro USB connector 126 described above, a connection by which the rechargeable battery 330 contained within the housing 340 may be charged and also provides an alternative power connection to the device 300 to allow the device to be powered directly via a wall plug connection. It should be understood that while a USB connection 126 is disclosed, any suitable mobile device connection or connector may be employed such as an Apple 30 pin or 8 pin connector, which may further facilitate direct wired connection with the mobile device 10

A representative implementation of the electrical circuitry/components contained in the housing 340 are illustrated in FIG. 6. In the illustrated implementation a single assembled PCB 320 is employed to implement the visual notification and user interface control remote control features of the band 300. The circuitry of the PCB 320 illustrated in FIG. 6 includes the following.

a. Six red green blue (RGB) LEDs 321A-F—that are spaced apart under the visual notification lens 310 to provide a generally uniform glow of light from the lens—emit RGB light to create a spectrum of light colors, which can be emitted in different durations and intensity patterns (for example, the RGB LED can blink and breath (fade in and out) in patterns), each of which can represent one or more notifications as previously described in the visual notification colors set forth in the table set forth above.

b. A Bluetooth low energy communication module 322 that—like the BLE module 122 described above—is capable of transmitting and receiving wireless communications, including notifications, from the mobile device to which it is paired. As previously noted, a GATT protocol may be employed. The BLE module is configured to communicate with the mobile device via the mobile device operating system (such as the Apple iOs or Android) or an application residing thereon, such as that previously described in connection with the POD.

c. A micro-controller (MCU) 323 is employed to (a) control the light being emitted by the RGB LEDs 321A-F, (b) manage the power coming in externally from the USB connector 336 to recharge the battery 330 and/or power the device 300 as well the battery power 330 used to power the device 300; (c) control the communications sent by the BLE module 320, (d) process the communications received by BLE module, (e) process the signals or input received from the buttons of the user control interface and communicate with BLE module and/or visual notification LEDs to effectuate the corresponding operations/functionalities for those buttons (e.g., play, pause or track forward and backwards music or media source on the mobile device; control the volume up or down, answer a call or make an emergency call, clear a notification or check batter life, control a camera shutter or video, pair the band to the mobile device as previously described in connection with the pod embodiment, etc.).

d. An ambient light sensor, like that previously described above in connection with reference numeral 124, may also be included on the PCB 320 to sense the intensity of light external to the lens and provide that input to the microcontroller 323 to control or adjust the intensity of the light being emitted by the LEDs 321A-F for the purposes previously described.

e. A micro Universal Serial Bus (USB) connection 326 may also be included to provide a connection by which the rechargeable battery 330 can be charged, while also providing an alternative power connection to the device 300. The device 300 can thus via the USB connection be powered directly via a wall plug connection or other external power source.

f. The multiple depressible buttons 374, 375, 376 and 377A-B are also located on the the PCB 320 and as previously noted connected to the MCU 323 to provide a user control interface that triggers the various operations of the device described above. As in the pod embodiment, the duration and manner by which the buttons are depressed may trigger different operations using the same button.

It should be understood, as previously noted, that while a single PCB may be employed, the functionality and operations may be embodied in multiple PCBs and/or distributed among one or more discrete electronic components that effectuate, either in hardware or software or a combination thereof, the functionalities described above.

Although the various inventive aspects are herein disclosed in the context of certain preferred embodiments, implementations, and examples, it will be understood by those skilled in the art that the present invention extends beyond the specifically disclosed embodiments to other alternative embodiments and/or uses of the various aspects and obvious modifications and equivalents thereof. In addition, while a number of variations of the aspects have been shown and described in detail, other modifications, which are within their scope will be readily apparent to those of skill in the art based upon this disclosure. It should be also understood that the scope this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A wireless visual notification device for receiving notifications from a mobile device, the visual notification device comprising:
   a housing including an upper semi-transparent white colored shell that is received within a lower base;
   an assembled printed circuit board (PCBA) housed within said housing that includes three red, blue, green ("RGB") LEDs, a Bluetooth interface module capable of being wirelessly paired with the mobile device, and a microcontroller that controls the duration, intensity, and color of light that is emitted by the LEDs;
   a rechargeable battery housed within said housing that provides power to the LEDs, Bluetooth module, and microcontroller;
   wherein said microcontroller is configured to control the LEDs based on notification signals wirelessly sent from the mobile device and received by the Bluetooth module; and
   a depressible button located on the underside of the PCBA that when depressed triggers various operations selected from a group consisting of: (a) activating the notification device to allow pairing with the mobile device, (b) cancel a visual or audible notification, (c) triggering a demo mode operation of the device to present a pre-set display of light colors at specified durations or patterns, (d) triggering the notification device to check the rechargeable battery voltage and display a visual representation of the percentage of batter voltage remaining on the battery, and (e) turning on and off the power to the device.

2. The visual notification device of claim 1, wherein a speaker is contained within the housing and wherein said speaker is controlled by said microcontroller in response to the received notification signals.

3. The visual notification device of claim 1, wherein the microcontroller controls the RGB LEDs so that they blink and fade in and out in a fixed duration and timing pattern.

4. The visual notification device of claim 1, wherein the microcontroller controls the RGB LEDs so that the light emitted from the shell of the housing includes one or more colors in the spectrum of colors of a group consisting of white, teal, cyan, blue, pink, purple, green, yellow, orange, and red light.

5. The visual notification device of claim 1 further including an ambient light sensor that is configured to sense the intensity of light external to the housing and provide the sensed input to the microcontroller, whereby the microcontroller in response thereto adjusts the intensity of the light being emitted by one or more of the LEDs.

6. The visual notification device of claim 1 further including a Universal Serial Bus (USB) connection incorporated into said housing that is connected to the rechargeable battery to facilitate recharging of the battery.

7. The visual notification device of claim 1 further including a Universal Serial Bus (USB) connection incorporated into said housing that is connected to microcontroller to facilitate direct non-battery powering of the microcontroller, the Bluetooth module and LEDs.

8. A wireless visual notification device for receiving notifications from a mobile device, the visual notification device comprising:
   a housing including an upper semi-transparent white colored shell that is received within a lower base;
   an assembled printed circuit board (PCBA) housed within said housing that includes a red, blue, green ("RGB") LED at each of at least three corners of the assembled printed circuit board, a Bluetooth interface module capable of being wirelessly paired with the mobile device, and a microcontroller that controls the duration, intensity, and color of light that is emitted by the LEDs;
   a rechargeable battery housed within said housing that provides power to the LEDs, Bluetooth module, and microcontroller, wherein said microcontroller is configured to control the LEDs based on notification signals wirelessly sent from the mobile device and received by the Bluetooth module; and
   a depressible button located on the underside of the PCBA that when depressed triggers various operations selected from a group consisting of: (a) activating the notification device to allow pairing with the mobile device, (b) cancel a visual or audible notification, (c) triggering a demo mode operation of the device to present a pre-set display of light colors at specified durations or patterns, (d) triggering the notification device to check the rechargeable battery voltage and display a visual representation of the percentage of batter voltage remaining on the battery, and (e) turning on and off the power to the device.

9. The visual notification device of claim 8, wherein said base further includes a user button interface positioned on the outer bottom face of the base that is configured to engage the depressible button when the user presses down on the shell.

10. A wireless visual notification device for receiving notifications from a mobile device, the visual notification device comprising:
    a housing including an upper semi-transparent white colored shell that is received within a lower base;
    an assembled printed circuit board (PCBA) housed within said housing that includes three red, blue, green ("RGB") LEDs, a Bluetooth interface module capable of being wirelessly paired with the mobile device, and a microcontroller that controls the duration, intensity, and color of light that is emitted by the LEDs;
    a rechargeable battery housed within said housing that provides power to the LEDs, Bluetooth module, and microcontroller, wherein said microcontroller is configured to control the LEDs based on notification signals wirelessly sent from the mobile device and received by the Bluetooth module; and
    a motion sensor that is connected to the microcontroller and that in response to motion by the user sends a signal to the microcontroller to cancel the response of the microcontroller to prior notification data received by the microcontroller from the Bluetooth module.

11. A wireless visual notification device for receiving notifications from a mobile device, the visual notification device comprising:
    a housing including a semi-transparent shell;
    an assembled printed circuit board (PCBA) housed within said housing that said PCBA has a plurality of corners and includes at least three red, blue and green ("RGB") LEDs spread apart at the corners, a Bluetooth interface module capable of being wirelessly paired with the mobile device, and a microcontroller that controls the duration, intensity, and color of light that is emitted by the LEDs;

a rechargeable battery housed within said housing that provides power to the LEDs, Bluetooth module, and microcontroller, wherein said microcontroller is configured to control the LEDs based on notification signals wirelessly sent from the mobile device and received by the Bluetooth module; and a depressible button located on the underside of the PCBA that when depressed triggers various operations selected from a group consisting of: (a) activating the notification device to allow pairing with the mobile device, (b) cancel a visual or audible notification, (c) triggering a demo mode operation of the device to present a pre-set display of light colors at specified durations or patterns, (d) triggering the notification device to check the rechargeable battery voltage and display a visual representation of the percentage of batter voltage remaining on the battery, and (e) turning on and off the power to the device.

12. The visual notification device of claim 11, further comprising a wrist band for strapping around a user's wrist.

13. The visual notification device of claim 12, further comprising a user control interface that is adapted to remotely control one or more camera features of the mobile device.

* * * * *